United States Patent
Hessler et al.

(10) Patent No.: US 10,218,489 B2
(45) Date of Patent: Feb. 26, 2019

(54) WIRELESS BACKHAUL CONFIGURATION

(71) Applicant: TELEFONAKTIEBOLAGET LM ERICSSON (PUBL), Stockholm (SE)

(72) Inventors: Martin Hessler, Linköping (SE); Andreas Bergström, Vikingstad (SE); Erik Eriksson, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 163 days.

(21) Appl. No.: 15/311,097

(22) PCT Filed: May 16, 2014

(86) PCT No.: PCT/EP2014/060051
§ 371 (c)(1),
(2) Date: Nov. 14, 2016

(87) PCT Pub. No.: WO2015/172838
PCT Pub. Date: Nov. 19, 2015

(65) Prior Publication Data
US 2017/0078077 A1    Mar. 16, 2017

(51) Int. Cl.
*H04L 5/14* (2006.01)
*H04L 27/26* (2006.01)
(Continued)

(52) U.S. Cl.
CPC .............. *H04L 5/14* (2013.01); *H04B 7/2656* (2013.01); *H04L 5/1469* (2013.01);
(Continued)

(58) Field of Classification Search
CPC ... H04L 27/2646; H04L 27/2656; H04L 5/14; H04L 5/1469; H04B 7/2643; H04B 7/2656; H04W 72/0446; H04W 72/1273
See application file for complete search history.

(56) References Cited

U.S. PATENT DOCUMENTS

2011/0080896 A1   4/2011 Krishnamurthy et al.
2012/0044841 A1* 2/2012 Chen .................. H04B 7/155
                                                370/279
(Continued)

FOREIGN PATENT DOCUMENTS

EP        2 568 755 A1      3/2013
WO     WO 2010/099485 A1   9/2010
WO     WO 2010/100558 A2   9/2010

OTHER PUBLICATIONS

Nokia. Timing alignment of DL backhaul. 3GPP Draft; R1-101912 DL Timing. 3rd Generation Partnership Project (3GPP). Mobile Competence Centre; 650. Route Des Lucioles; F-06921 Sophia-Antipolis Cedex; France. vol. RAN WG1. No. Beijing. china; 20100412. Apr. 6, 2010 (Apr. 6, 2010).

*Primary Examiner* — Paul H Masur

(57) ABSTRACT

The disclosure presents a method embodiment, performed in a network node, of coordinating transmission on a backhaul link with transmission on an end-user access link in a wireless network. Transmission is performed in time division duplex, TDD, radio frames transmitted on respective frequency bands on the backhaul link and the end-user access link. The method comprises determining a backhaul TDD configuration of the backhaul link and an end-user access TDD configuration of the end-user access link. A backhaul sub-frame and an end-user access sub-frame are selected. An offset is determined between the backhaul sub-frame and the end-user access sub-frame. Transmission on the backhaul link or on the end-user access link is adjusted with a time-shift relative to transmission on the backhaul link, wherein the time-shift is based on the determined offset.

23 Claims, 9 Drawing Sheets

(51) Int. Cl.
*H04B 7/26* (2006.01)
*H04W 72/04* (2009.01)
*H04W 72/12* (2009.01)

(52) U.S. Cl.
CPC ...... *H04L 27/2646* (2013.01); *H04L 27/2656* (2013.01); *H04W 72/0446* (2013.01); *H04W 72/1273* (2013.01)

(56) References Cited

U.S. PATENT DOCUMENTS

| | | | |
|---|---|---|---|
| 2015/0373550 A1* | 12/2015 | Hong | H04W 72/0446 370/254 |
| 2016/0134413 A1* | 5/2016 | Zhang | H04L 1/1854 370/280 |

\* cited by examiner

WIRELESS BACKHAUL CONFIGURATION

TECHNICAL FIELD

The present disclosure is directed to a method and a network node for coordinating transmission on a wireless backhaul link with transmission on an end-user access link in a wireless network.

BACKGROUND

3GPP Long Term Evolution, LTE, is the fourth-generation mobile communication technologies standard developed within the 3rd Generation Partnership Project, 3GPP, to improve the Universal Mobile Telecommunication System, UMTS, standard to cope with future requirements in terms of improved services such as higher data rates, improved efficiency, and lowered costs. In a typical cellular radio system, wireless devices also known as mobile stations and/or user equipment units, UEs, communicate via a radio access network, RAN, to one or more core networks. The Universal Terrestrial Radio Access Network, UTRAN, is the radio access network of a UMTS and Evolved UTRAN, E-UTRAN, is the radio access network of an LTE system. In an UTRAN and an E-UTRAN, a wireless device is wirelessly connected to a Radio Base Station, RBS, commonly referred to as a NodeB, NB, in UMTS, and as an evolved NodeB, eNB or eNodeB, in LTE. An RBS is a general term for a radio network node capable of transmitting radio signals to a wireless device and receiving signals transmitted by a wireless device.

There are numerous solutions addressing increasing demands of capacity and coverage in a mobile wireless network. One technique is a heterogeneous network deployment, wherein low power radio base stations provide enhanced coverage in a macro cell defined by a high power base station. In the following, the term Pico radio base station, Pico RBS, will be used to denominate a low power radio base station. The term macro RBS will be used to denominate a high power radio base station. A heterogeneous network deployment is, for example, found in urban areas where macro RBS are located to provide radio coverage in large areas, e.g. on a roof top, while Pico RBS are situated to provide local coverage near crowded areas, e.g. on building walls or lamp posts. In the heterogeneous deployment situation, there is usually a large number of Pico RBS deployed within the coverage area of one macro RBS.

The Pico RBS is usually configured to provide one or more combinations of radio access technologies over the radio access link, e.g. 3GPP LTE, 3GPP HSPA, 3GPP GSM or IEEE 802.11x, also known as Wi-Fi. Each Pico RBS is connected to the wireless network by means of a backhaul link. In the present disclosure, the backhaul link is a wireless backhaul link set up between the Pico RBS and a backhaul hub in the wireless network. A macro RBS is set up to function as a backhaul hub. The wireless backhaul link can be implemented using microwave radio communication between the Pico RBS and the macro RBS. It is also common to implement the wireless backhaul link using a 3GPP radio access technology, e.g. 3GPP LTE. For such situations, the backhaul link is typically implemented by using a wireless device; also known as user equipment, UE, embedded into the Pico RBS. On the hub side of the backhaul link, the receiving macro RBS handles the connection as a wireless connection to a connected user equipment, UE. Typically more than one Pico RBS will have a backhaul link to the same backhaul hub, e.g. to a macro RBS. Radio resource management functions are used in the backhaul hub to handle scheduling and prioritization of traffic on the backhaul links to Pico RBSs.

There are two basic operating modes in LTE: Frequency Division Duplex, FDD, and Time Division Duplex, TDD. In FDD the downlink and uplink transmissions are separated on different carriers on separate frequencies, while on TDD downlink and uplink transmissions are separated in the time domain. For the scenario with a wireless backhaul link from a Pico RBS to a macro RBS, the same basic operating mode, e.g. TDD, is generally used for the end-user access radio link as well as for the backhaul radio link.

For TDD, the radio resources of a radio frame are configured for uplink or downlink transmission, wherein some sub-frames are allocated for uplink transmission and some sub-frames for downlink transmission. In LTE, a number of configurations, configuration 0-6, have been provided defining the sub-frames allocated for uplink, UL, and downlink, DL, transmission in a radio frame. To reduce interference between downlink and uplink transmissions in different cells, neighboring cells typically use the same downlink/uplink configuration.

When operating in TDD, there is an inherent latency caused by the partitioning of the radio frame in UL and DL sub-frames. On the DL, data for transmission to an end-user wireless device, e.g. user equipment, UE, can arrive during sub-frames configured for uplink transmission. The transmission will then be delayed a couple of Transmission Time Intervals, TTIs, prior to transmission. Correspondingly, for transmission on the uplink, the wireless device needs to request uplink transmission resources and to wait for a DL sub-frame to receive a grant on PDCCH and then also wait for the corresponding UL sub-frame to transmit.

For the scenario where a TDD operating mode is used both for a wireless backhaul link and an end-user access radio link, latencies caused by the radio frame configuration into uplink and downlink sub-frames will be present on both the wireless backhaul link and on the end-user access link. From a data traffic perspective, the latency on the wireless backhaul link is added to the latency on the end-user access link thereby resulting in delayed data delivery and increased need for buffering data.

SUMMARY

It is an object of the present disclosure to provide embodiments solving the problem of additive latencies in a wireless network including a backhaul link and an end-user access link operating in a Time Division Duplex, TDD, operating mode.

This is achieved by a method performed in a network node, a network node configured to perform the method and a computer-readable storage medium including a computer program run in the network node.

The disclosure presents a method embodiment, performed in a network node, of coordinating transmission on a backhaul link with transmission on an end-user access link in a wireless network, wherein transmission is performed in time division duplex, TDD, radio frames transmitted on respective frequency bands on the backhaul link and the end-user access link. The method comprises determining a backhaul TDD configuration of the backhaul link and an end-user access TDD configuration of the end-user access link. A backhaul sub-frame and an end-user access sub-frame are selected. An offset is determined between the backhaul sub-frame and the end-user access sub-frame. Transmission on the backhaul link or on the end-user access link is adjusted by a time-shift based on the determined offset.

The disclosure addresses the scenario wherein one or more base stations are deployed using wireless backhaul and where the entire system—both the backhaul as well as the cells for end-user access provided by these base stations—are operating in TDD mode. In this scenario, large benefits in terms of latency can be achieved by the disclosed method of coordinating transmission on the backhaul link with transmission on the end-user access link, ensuring an optimal alignment between the TDD configurations of the backhaul link and that of the end-user access link. When performing the disclosed method, reduction is possible of the extra delays imposed by a TDD based radio access network when a TDD based backhaul is used. This reduces end-user and control plane latency, as well as the need of buffering, and hence memory, at the backhaul client side, Low latency is of particular importance when providing delay sensitive services to the end-user.

According to an aspect of the disclosure, the backhaul TDD configuration and the end-user access TDD configuration are equal. Having the same TDD configuration on the backhaul as well as in the radio access network, RAN, cells, the symmetry between the two links provides benefits for the coordinated transmission.

According to an aspect of the disclosure, the offset is a downlink offset and wherein the backhaul sub-frame is a downlink, DL, sub-frame and the end-user access sub-frame is a DL sub-frame representing a next DL scheduling opportunity in the end-user access of the wireless network. By shifting the downlink transmission on the end-user access link with the downlink offset, it is ensured that the downlink scheduling opportunities of the end-user access links are coordinated with the downlink transmission/reception on the backhaul.

According to an aspect of the disclosure, the time-shift is the downlink offset compensated for a decoding time for decoding data received over the backhaul and a preparation time for preparing transmission over the end-user access. The compensating for decoding time and preparation time further provides an optimized alignment of DL data transmission over the end-user access to the backhaul timing so that each backhaul sub-frame is followed by an end-user access DL sub-frame at the same time as the DL data is ready to be transmitted over the end-user access.

According to an aspect of the disclosure, the offset is an uplink offset and wherein the backhaul sub-frame is an uplink, UL, sub-frame and the end-user access sub-frame is an UL sub-frame representing a preceding UL scheduling opportunity in the end-user access of the wireless network. By scheduling transmission on the uplink with an uplink offset, it is ensured that the uplink scheduling opportunities of the end-user access links are coordinated with the uplink transmission/reception on the backhaul. This will be even more beneficial in the uplink, since UL transmission is further delayed by the scheduling request and the need to receive an uplink grant prior to initiating uplink transmission.

According to an aspect of the disclosure, the time-shift is the uplink offset compensated for a decoding time for decoding data received over the end-user access and a preparation time for preparing transmission over the backhaul.

According to an aspect of the disclosure, the UL scheduling in the backhaul is an in advance scheduling or a Semi-Persistent Scheduling. In advance scheduling or Semi-Persistent Scheduling provides for a further reduction of the uplink delay when uplink resources are scheduled without preceding scheduling requests.

According to an aspect of the disclosure, the time-shift is a weighted average of a downlink offset compensated for a decoding time for decoding data received over the backhaul and a preparation time for preparing transmission over the end-user access; and an uplink offset compensated for a decoding time for decoding data received over the end-user access and a preparation time for preparing transmission over the backhaul.

According to an aspect of the disclosure, the time-shift is further based on a probability estimate of the usage of DL and UL sub-frames.

According to an aspect of the disclosure, the TDD configuration is one of Configuration 0-6, as defined in the LTE 3GPP standard.

According to another aspect of the disclosure, the backhaul TDD configuration and the end-user TDD configuration differ. When having different TDD configurations, the coordinated transmission on the backhaul and end-user access provides significant benefits, especially when using a downlink centric configuration in any of the links.

According to an aspect of the disclosure, the offset is a downlink offset and wherein the backhaul sub-frame is a downlink, DL, sub-frame and the end-user access sub-frame is a DL sub-frame representing a preferred DL scheduling opportunity in the end-user access of the wireless network.

According to an aspect of the disclosure, the offset is an uplink offset and wherein the backhaul sub-frame is an uplink, UL, sub-frame and the end-user access sub-frame is an UL sub-frame representing a preferred UL scheduling opportunity in the end-user access of the wireless network.

According to an aspect of the disclosure, the backhaul TDD configuration is one of Configuration 0-6 and the end-user access TDD configuration is another of Configuration 0-6, as defined in the LTE 3GPP standard.

According to an aspect of the disclosure, either the backhaul TDD configuration or the end-user access TDD configuration is a flexible TDD. When using flexible TDD, it is possible to change the direction of sub-frames. The coordinated transmission improves the ability to benefit from flexible TDD.

According to an aspect of the disclosure, the time-shift is calculated based on a probability estimate that a direction of the backhaul sub-frame or the end-user access sub-frame is reversed in a direction corresponding to that of the end-user access sub-frame or the backhaul sub-frame.

According to an aspect of the disclosure, uplink transmission and downlink transmission on the end-user access link and/or the backhaul link is performed on different frequency bands.

According to an aspect of the disclosure, the shifting of transmission on the end user access link comprises providing information on the time-shift to a radio base station, RBS, scheduling transmission on the end-user access link.

The disclosure also presents a network node embodiment for coordinating transmission on a backhaul link with transmission on an end-user access link in a wireless network, wherein transmission is performed in time division duplex, TDD, radio frames transmitted on respective frequency bands on the backhaul link and the end-user access link. The network node comprises a processing circuitry, a communication interface and a memory. The memory contains instructions executable by said processing circuitry whereby said network node is operative to determine a backhaul TDD configuration of the backhaul link and an end-user access TDD configuration of the end-user access link; to select a backhaul sub-frame for the backhaul TDD configuration and an end-user access sub-frame for the end-user access TDD configuration; to determine an offset between the backhaul sub-frame and the end-user access sub-frame; and to adjust transmission on the backhaul link or on the end-user access by a time-shift based on the determined offset.

According to an aspect of the disclosure, the network node is part of the management system for the wireless network and the network node is operative to shift transmission on the end user access link by providing information on the time-shift to a radio base station, RBS, scheduling transmission on the end-user access link.

According to aspect of the disclosure, the network node is a low power radio base station, RBS, of the wireless network and the communication interface further comprises end-user access radio circuitry for radio communication on a first frequency band in an end-user access interface and backhaul radio circuitry for radio communication on a second frequency band in a backhaul interface.

According to an aspect of the disclosure, the backhaul TDD configuration and the end-user access TDD configuration is the same.

According to another aspect of the disclosure, the backhaul TDD configuration and the end-user access TDD configuration differ.

The disclosure also presents a computer-readable storage medium embodiment having stored a computer program which when run in the network node, causes the network node to perform any of the above disclosed method aspects.

The network node and the computer-readable storage medium each display advantages corresponding to the advantages already described in relation to the disclosure of the method in a network node.

DEFINITIONS

3GPP 3rd Generation Partnership Project
DL Downlink
FDD Frequency Division Duplex
GSM Global System for Mobile communications
HSPA High-Speed Packet Access
LTE Long Term Evolution
MBMS Multimedia Broadcast/Multicast Service
MBSFN Multicast-Broadcast Single Frequency Network
RAN Radio Access Network
RBS Radio Base Station
TDD Time Division Duplex
UL Uplink

BRIEF DESCRIPTION OF THE DRAWINGS

Further objects, features and advantages of the present disclosure will appear from the following detailed description, wherein some aspects of the disclosure will be described in more detail with reference to the accompanying drawings, in which.

DETAILED DESCRIPTION

The general object or idea of embodiments of the present disclosure is to address at least one or some of the disadvantages with the prior art solutions described above as well as below. The various steps described below in connection with the figures should be primarily understood in a logical sense, while each step may involve the communication of one or more specific messages depending on the implementation and protocols used. Embodiments of the present disclosure relate, in general, to solving the problem of additive latencies in a wireless network including a backhaul link and an end-user access link operating in a Time Division Duplex, TDD, operating mode.

Figure 1A:
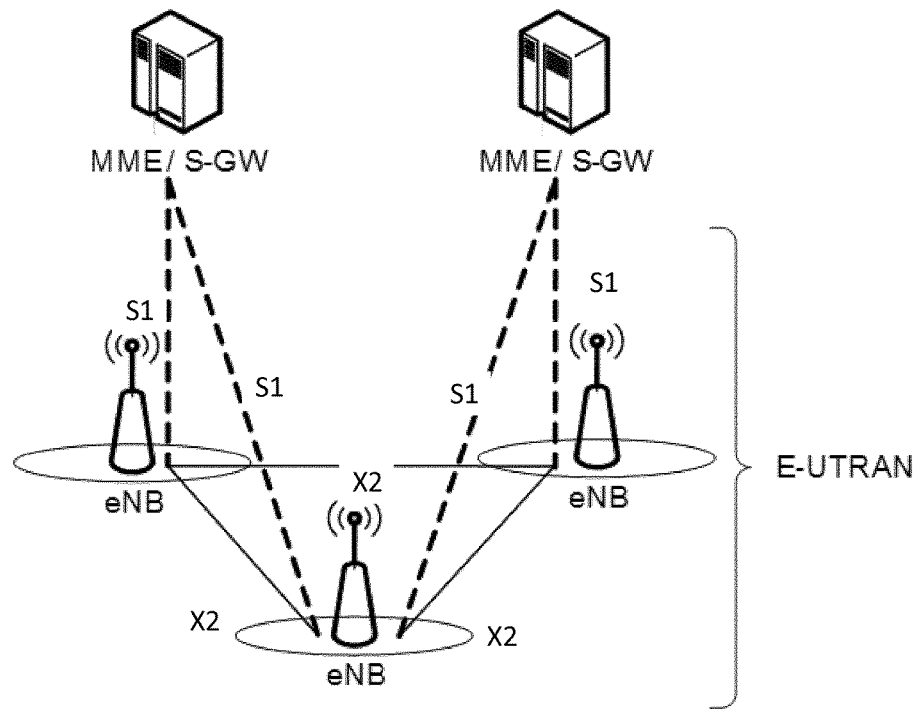
FIG. 1
    a. shows the basic LTE architecture;
    b. discloses a cellular structure with low power radio base stations.

FIG. 1a schematically illustrates a basic LTE, Long Term Evolution, network architecture, including radio base stations, RBS, arranged for communicating with wireless devices over a wireless communication interface. The plurality of RBSs, here shown as eNBs, is connected to MME/S-GW entities via S1 interfaces. The eNBs are connected to each other via X2 interfaces.

Figure 1B:
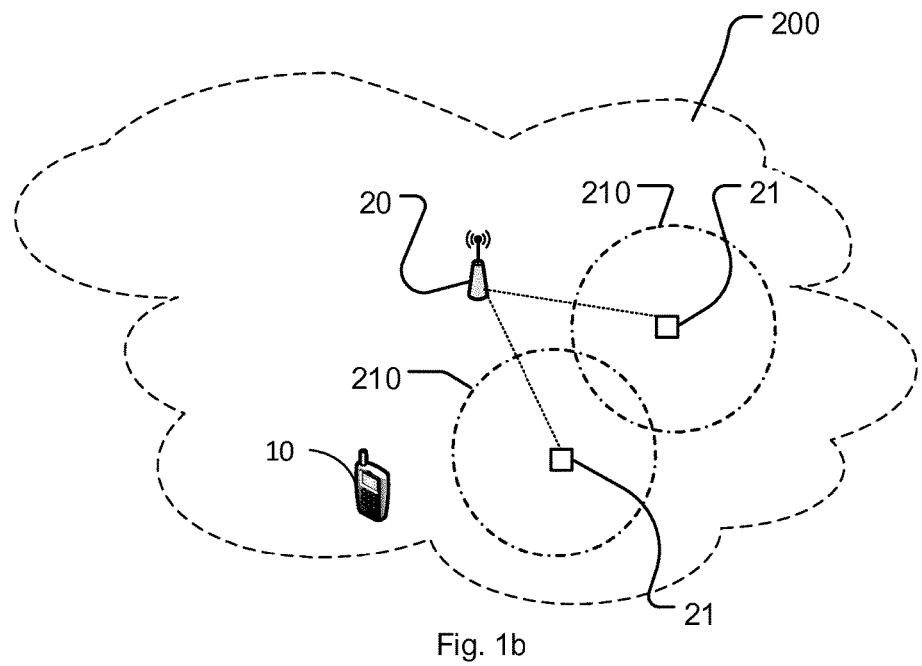

FIG. 1b exemplifies a network deployment wherein very large capacity and performance is sought by deploying small cells 210 defined by the coverage areas of low power radio base stations 21, RBSs, for example Micro RBS and Pico RBS; in the following denominated Pico RBSs. A macro radio base station 20, e.g. eNB, provides coverage in a large cell 200 including a number of small cells 210. The Pico RBSs 21 are typically geographically oriented to densely populated areas with many users in the vicinity of a Pico RBS. A wireless device 10, e.g. a mobile/cellular phone or any other type of user equipment, is using a Radio Access Network, RAN, service to access the mobile network services. A Pico RBS provides one or a combination of several radio access technologies over the radio access link, e.g. 3GPP LTE, 3GPP HSPA, 3GPP GSM or IEEE 802.11x, also known as Wi-Fi. A Pico RBS needs to backhaul the RAN traffic to the mobile network, and uses a wireless backhaul link.

Figure 2A:
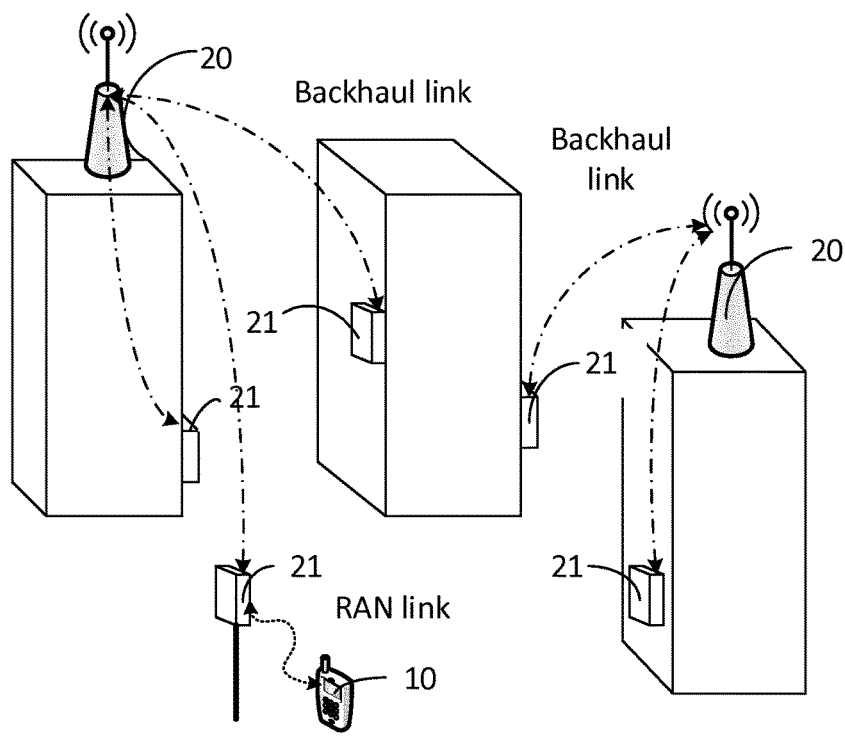
FIG. 2
    a. is a schematic illustration of a dense urban heterogeneous deployment scenario including small cells;
    b. is a schematic illustration of a wireless backhaul set up.

FIG. 2a provides a schematic illustration of a dense urban heterogeneous deployment scenario including small cells wherein macro radio base stations, RBS, 20 and Pico radio base stations 21 are connected via backhaul radio links. The macro RBSs 20 are generally located above rooftops, while the Pico RBSs 21 often are located on building walls and lamp posts. A user equipment 10, UE, also known as a wireless device, a mobile phone or a cellular phone, is illustrated as using radio access network, RAN, service to access the mobile network services over a RAN link. The Pico RBSs 21 provide one or a combination of several radio access technologies over the radio access link, e.g. 3GPP LTE, 3GPP HSPA, 3GPP GSM or IEEE 802.11x (Wi-Fi). The Pico RBSs 21 need to backhaul the RAN traffic to the mobile network, and each use a wireless backhaul link to the macro RBS 20 for this.

Figure 2B:
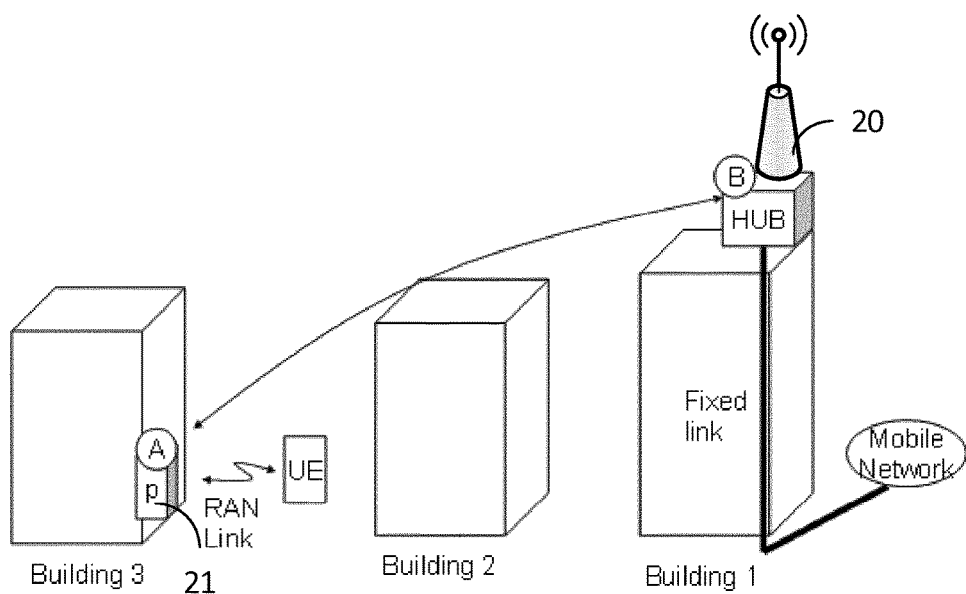

FIG. 2b further details the wireless backhaul link. The link is implemented by means of two terminals, Terminal A and Terminal B, on either side of this link. In the present disclosure, the backhaul link is a wireless backhaul link set up between a Pico RBS 21 and a backhaul hub in the wireless network. A macro RBS 20 is set up to function as a backhaul hub. In the present disclosure, the wireless backhaul link is implemented using a 3GPP radio access technology, e.g. 3GPP LTE. For such situations, the backhaul link is typically implemented by using a wireless device; also known as user equipment, UE, embedded into the Pico RBS. On the hub side of the backhaul link, the receiving macro RBS handles the connection as a wireless connection to a connected user equipment, UE. Typically more than one Pico RBS will have a backhaul link to the same backhaul hub, i.e. to a macro RBS. Radio resource management functions are used in the backhaul hub to handle scheduling and prioritization of traffic on the backhaul links to Pico RBSs. The backhaul hub is configured to forward traffic terminated on Terminal B to the mobile backhaul network via the illustrated fixed link, e.g. a fixed link over copper or fiber media. In the following disclosure, the wireless backhaul link is implemented using LTE backhauling.

Figure 3:
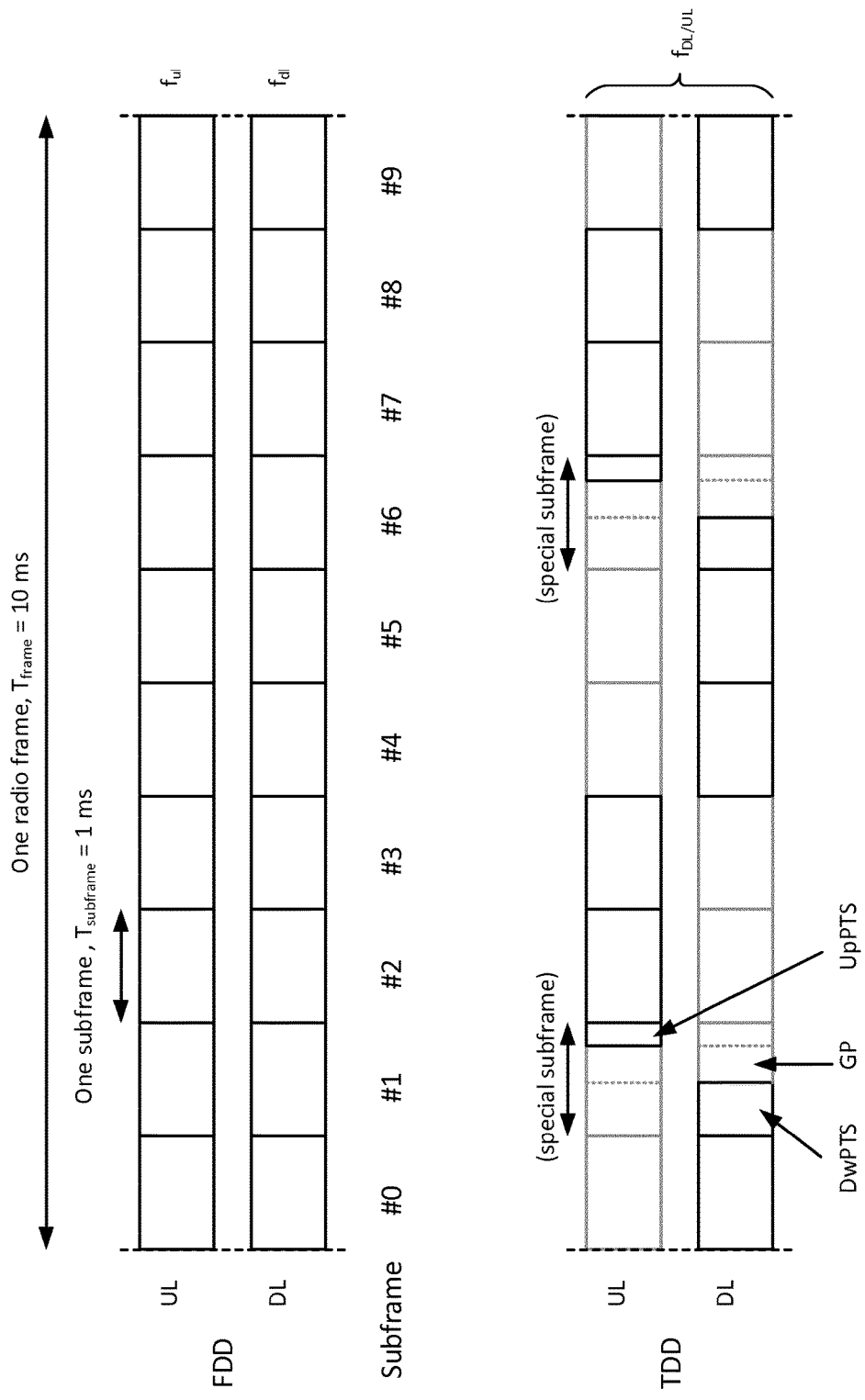
FIG. 3 is an illustration of an uplink/downlink time-frequency structure for FDD and TDD.

LTE supports operation in both paired and unpaired spectrum by supporting both FDD- and TDD-based duplex operation with the time-frequency structure illustrated in FIG. 3. In the case of FDD operating mode, the downlink and uplink transmissions are separated on different carriers on separate frequencies. In the case of TDD operating mode, the downlink and uplink transmissions are separated in the time domain. The following disclosure is directed to the situation where a TDD operating mode is used for the end-user access radio link as well as for the backhaul radio link.

Figure 4:
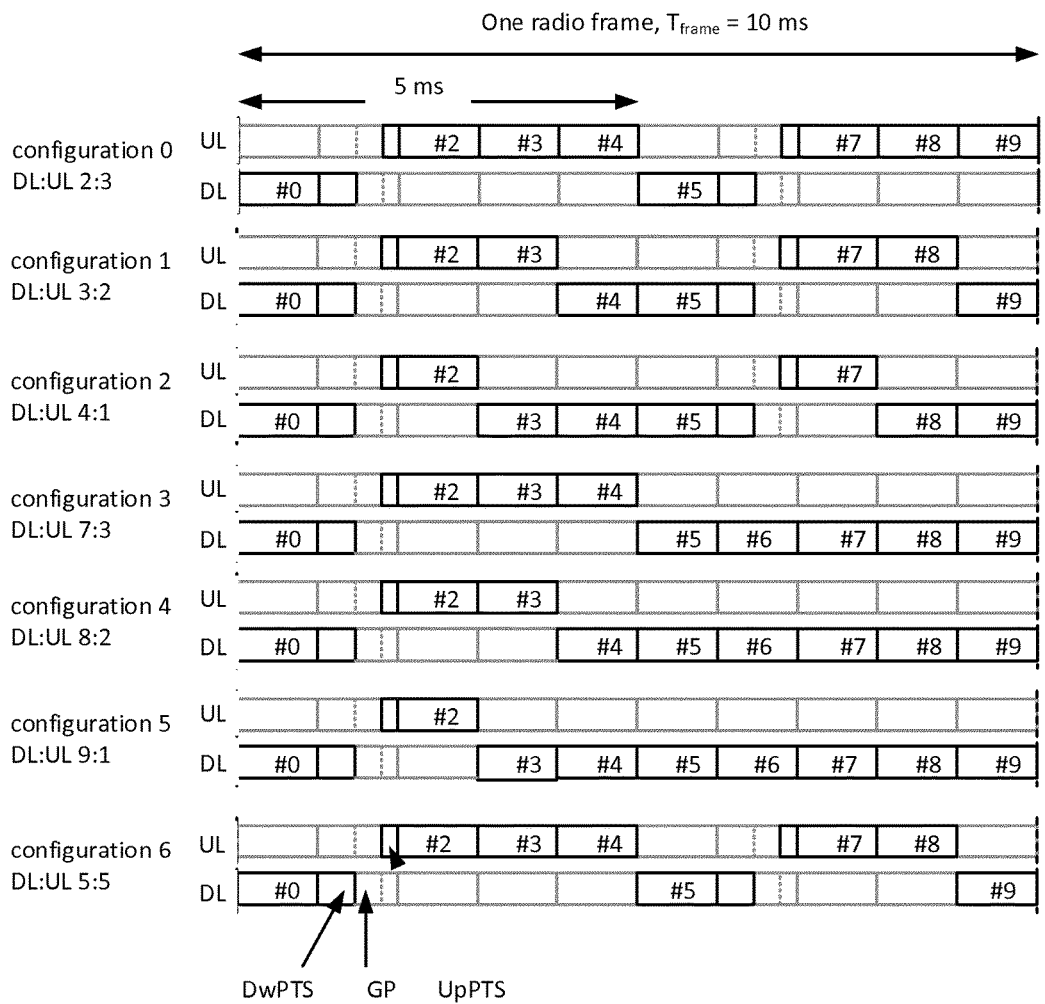
FIG. 4 are illustrations of different downlink/uplink configurations for TDD.

For the TDD operating mode there is a single carrier frequency only; uplink and downlink transmissions are separated in the time domain on a cell basis. For TDD, the radio resources of a radio frame are configured for uplink or downlink transmission, wherein some sub-frames are allocated for uplink transmission and some sub-frames for downlink transmission. In LTE, a number of configurations, configuration 0-6, has been provided defining the sub-frames allocated for uplink, UL, and downlink, DL, transmission in a radio frame. To reduce interference between downlink and uplink transmissions in different cells, neighboring cells typically use the same downlink/uplink configuration. FIG. 4 illustrates different downlink/uplink configurations defined for TDD in the LTE specification.

As discussed in the background section, use of a TDD operating mode both for a wireless backhaul link and an end-user access radio link, introduces the drawback of adding latencies from the wireless backhaul link and the end-user access link. From a data traffic perspective, the latency on the wireless backhaul link is added to the latency on the end-user access link thereby resulting in delayed data delivery and increased need for buffering data.

Figure 5:
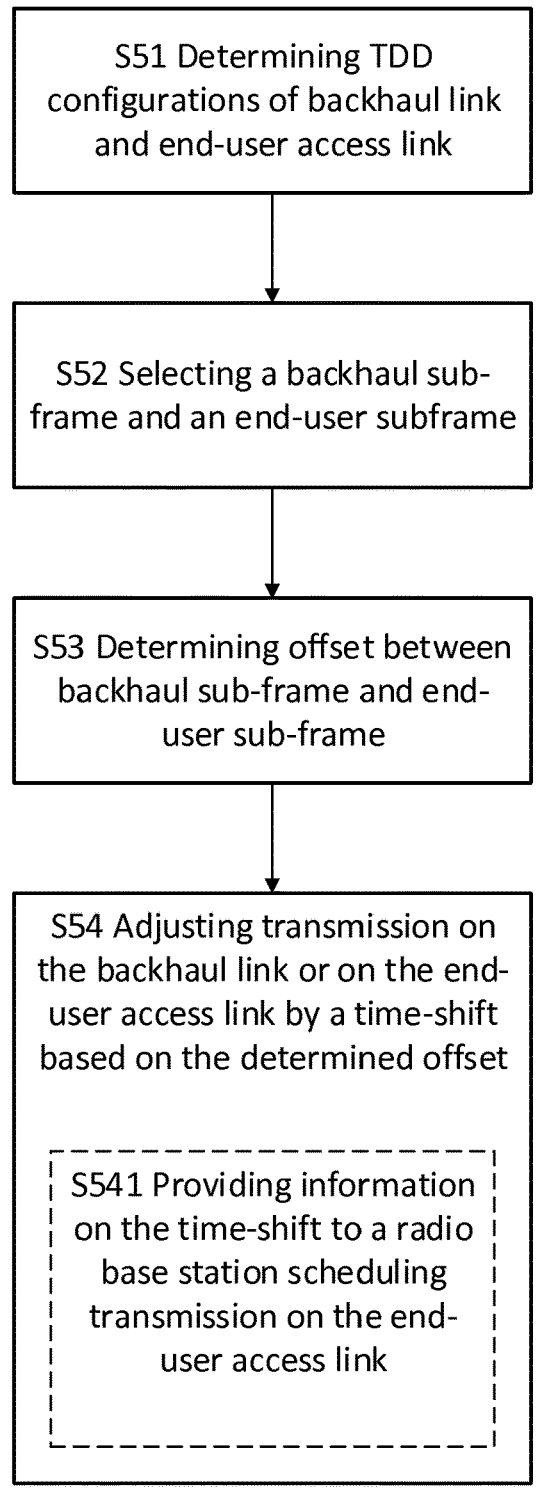
FIG. 5 is a flow chart schematically illustrating example embodiments of a method steps performed in a network node.

FIG. 5 discloses is a flow chart schematically illustrating example embodiments of method steps performed in a network node in order to solve the problem of additive latencies when transmission is performed in time division duplex, TDD, radio frames transmitted on respective frequency bands on the backhaul link and the end-user access link. Coordination of the transmission on the backhaul link and the end-user access link reduces the effect of the added latencies, thereby resulting in improved delay characteristics and a reduced need for buffering.

In a step S51, the TDD configurations of the backhaul link and the end-user access link are determined. The TDD configurations could be any of the TDD configurations illustrated in FIG. 4 when the TDD transmission is TDD based LTE. However, the disclosed concept is also applicable in any other TDD-based system. Thus, the TDD configuration determined in S51 could be either a predefined TDD configuration, or a sub-frame by sub-frame identification enabling an understanding of a repetitive distribution of UL and DL sub-frames for the backhaul link and another repetitive distribution of UL and DL sub-frames for the end-user access link.

In step S52, a reference point is selected for the wireless backhaul link by selecting a specific sub-frame in a radio frame, e.g. the first sub-frame of a radio frame, a first uplink or downlink sub-frame or a sub-frame having a specific sub-frame index. Step S52 also comprises selecting a reference point for the end-user access link. In analogy with the selection performed for the backhaul link, a specific end-user access sub-frame is selected, e.g. the first sub-frame of a radio frame, a first uplink or downlink sub-frame or a sub-frame having a specific sub-frame index. When the TDD configuration of the backhaul link is the same as the TDD configuration of the end-user access link, corresponding sub-frames are preferably selected for the backhaul link and the end-user access link, i.e. sub-frames having the same sub-frame index.

In step S53, the reference points on the backhaul link and the end-user access link, i.e. the selected backhaul sub-frame and the selected end-user access sub-frame are used to determine an offset between the backhaul sub-frame and the end-user access sub-frame. When considering the downlink, the offset reflects the time between a DL transmission/reception on the backhaul until the next DL scheduling opportunity is available on the end-user access link. When considering the uplink, the offset reflects the time between an UL reception on the end-user access link until the next UL scheduling opportunity on the backhaul link.

In step S54, transmission on the backhaul link or on the end-user access link is adjusted by a time-shift based on the determined offset, e.g. by adjusting the timing of radio frames on the end-user access link to the timing of radio frames on the backhaul-link with said time-shift. The operations of FIG. 5 will be described in further detail below.

Scenario 1: Same TDD configuration on backhaul and end-user access link

Figure 6A:
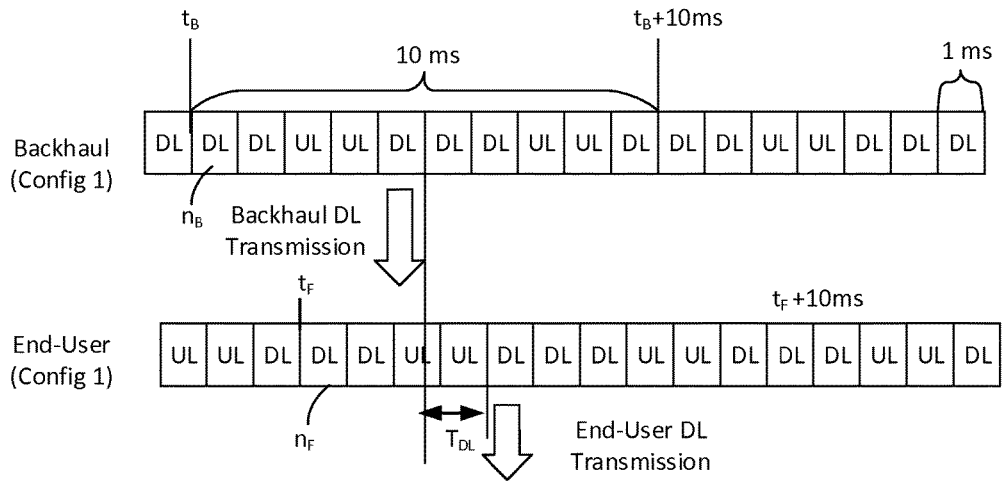
FIG. 6
    a. is an illustration of DL transmission with TDD Configuration 1 on backhaul and end-user access;
    b. is an illustration of UL transmission with TDD Configuration 1 on both backhaul and end-user access.

FIG. 6a is an illustration of DL transmission with TDD Configuration 1 on backhaul and end-user access. The figure discloses an example embodiment for a scenario where the same TDD configuration is used for the backhaul link and the end-user access link, i.e. when the backhaul TDD configuration and the end-user TDD configuration are the same.

In this setting a good alignment between UL and DL sub-frames is possible due to the symmetry between the respective TDD configurations. FIG. 6a discloses an example where TDD Configuration 1 is used for the case of DL transmission. Each radio frame of 10 ms consists of 10 sub-frames of 1 ms arranged in a TDD pattern of Configuration 1. Considering a radio frame on the backhaul link starting at the time $t_B$, the starting point of the radio frame is a DL sub-frame $n_B$. A radio frame on the end-user access link starts at time $t_F$, having a starting point of the radio frame in a DL sub-frame $n_F$. $T_{DL}$ denotes the time between the DL transmission on the backhaul link until the next DL scheduling opportunity is available on the end-user access link. Thus, $T_{DL}$ represents the extra time induced by having a TDD based wireless backhaul, i.e. the downlink offset determined when the backhaul sub-frame used in determining the offset is a downlink, DL, sub-frame, and the end-user access sub-frame used in determining the offset is a DL sub-frame representing the next DL scheduling opportunity in the end-user access of the wireless network.

The time-shift is determined based on the determined downlink offset $T_{DL}$. According to one aspect of the disclosure, in order to ensure that the end-user access DL sub-frame follows at the same time as the DL data is ready to be transmitted over the end-user access, the time-shift is the downlink offset ($T_{DL}$) compensated for a decoding time ($T_{DEC\_DL}$) for decoding data received over the backhaul and a preparation time, ($T_{PREP\_DL}$) for preparing transmission over the end-user access.

Figure 6B:
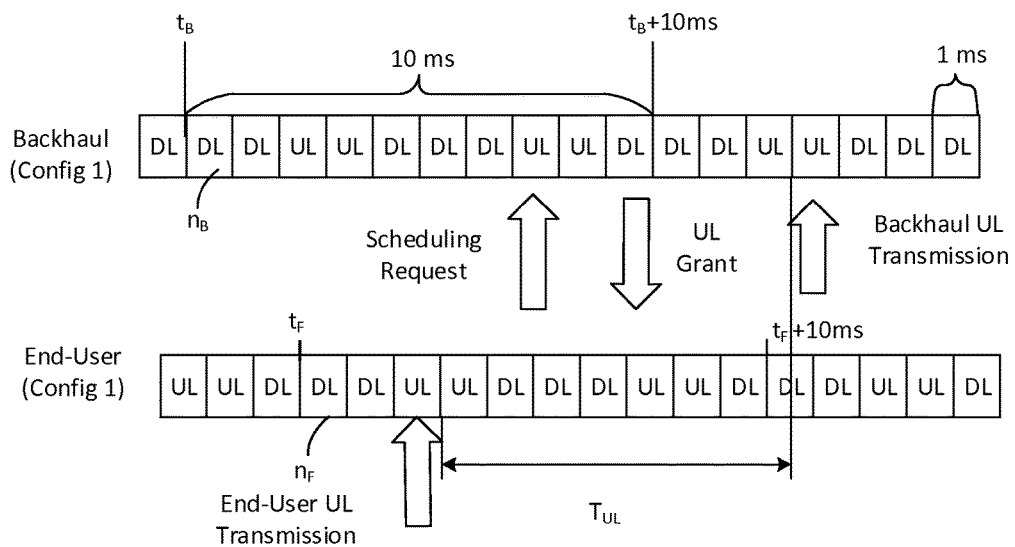

FIG. 6b is an illustration of UL transmission with TDD Configuration 1 on backhaul and end-user access. The figure discloses an example embodiment for a scenario where the same TDD configuration is used for the backhaul link and the end-user access link, i.e. when the backhaul TDD configuration and the end-user TDD configuration are the same.

FIG. 6b discloses an example where TDD Configuration 1 is used for the case of UL transmission. Each radio frame of 10 ms consists of 10 sub-frames of 1 ms arranged in a TDD pattern of Configuration 1. Considering a radio frame on the backhaul link starting at the time $t_B$, the starting point of the radio frame is a DL sub-frame $n_B$. A radio frame on the end-user access link starts at time $t_F$, having a starting point of the radio frame in a DL sub-frame $n_F$. $T_{UL}$ denotes the time between the UL transmission on the end-user access link until the next UL scheduling opportunity is available on the backhaul link. Thus, $T_{UL}$ represents the extra time induced by having a TDD based wireless backhaul, i.e. the uplink offset determined when the backhaul sub-frame used in determining the offset is an uplink, UL, sub-frame, and the end-user access sub-frame used in determining the offset is an UL sub-frame representing a preceding UL scheduling opportunity in the end-user access of the wireless network.

As is illustrated in FIG. 6b, the additional transmission delay introduced on the uplink, $T_{UL}$, is even worse than that of the downlink, since there is also a need for the client to send a Scheduling Request (SR) in order to request uplink transmissions during the next available UL transmission opportunity on the backhaul. Thereafter an UL Grant must be sent back to the client over the backhaul during the next following DL transmission opportunity. As is illustrated in FIG. 6b, the uplink offset, $T_{UL}$ could imply a transmission delay of more than four sub-frames with a corresponding need of buffering data until transmission is possible.

In accordance with an aspect of the disclosure, the delay $T_{UL}$ is minimized by making sure that each end-user access UL sub-frame is to be followed by a backhaul UL sub-frame at the same time as the UL data is ready to be transmitted over the backhaul. A time-shift used to adjust transmission on the end-user access link to the UL transmission opportunity on the backhaul link is based on the determined uplink offset $T_{UL}$. According to one aspect of the disclosure, in order to ensure a proper alignment of the radio frame on the end-user access link, a time-shift is used representing the uplink offset ($T_{UL}$) compensated for a decoding time ($T_{DEC\_UL}$) for decoding data received over the end-user access link and a preparation time, ($T_{PREP\_UL}$) for preparing transmission over the backhaul link.

According to an aspect of the disclosure, the UL scheduling in the backhaul is an in advance scheduling or a Semi-Persistent Scheduling. In advance scheduling and semi-persistent scheduling allows UL transmission without the preceding scheduling request; thus, further reduction of the offset between the end-user access link and the backhaul link is possible.

According to another aspect of the disclosure, the time-shift is a weighted average of a downlink offset ($T_{DL}$) compensated for a decoding time ($T_{DEC\_DL}$) for decoding data received over the backhaul and a preparation time, ($T_{PREP\_DL}$) for preparing transmission over the end-user access; and an uplink offset ($T_{UL}$) compensated for a decoding time ($T_{DEC\_UL}$) for decoding data received over the end-user access and a preparation time ($T_{PREP\_UL}$) for preparing transmission over the backhaul.

FIGS. 6a and 6b discloses the situation when TDD Configuration 1 is used, however, the same way of defining a suitable time-shift to introduce between radio frames on the backhaul link and on the end-user access link is of course also applicable for any of the other configurations TDD configuration 0-6 as disclosed in FIG. 4 as long as the same configurations are used for the backhaul link and for the end-user access link.

Scenario 2: Different TDD configurations on backhaul and End-user access link

Consider now the situation where the TDD configurations are, in contrast to what was the case in the previous section, not the same on the backhaul link and the end-user access link. This is a quite reasonable scenario, which could e.g. be the case when the general traffic situation is downlink-heavy (e.g. users downloading files, steaming video etc.). Since the backhaul represents the aggregated traffic over all the cells in the Pico RBS, then there is a fair chance that the TDD configuration on the backhaul need to be even more downlink centric than that of the end-user access in the cells of the Pico RBS.

Figure 7A:
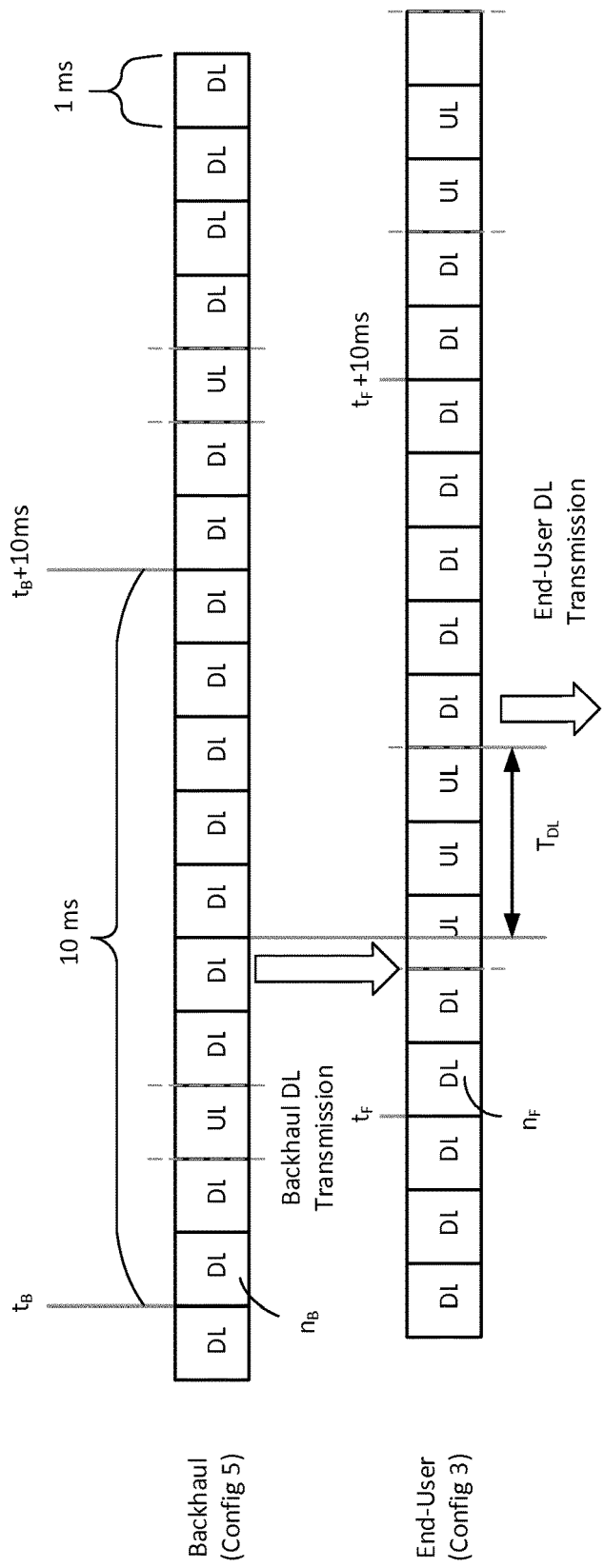
FIG. 7
    a. is an illustration of DL transmission with TDD Configuration 5 on the backhaul and TDD Configuration 3 for the end-user access;
    b. is an illustration of UL transmission when TDD Configuration 5 is used on the backhaul and TDD Configuration 3 is used on the end-user access.

FIG. 7a illustrates the situation for DL transmission with TDD Configuration 5 on the backhaul link and TDD Configuration 3 for the end-user access link. Irrespective of the selected configuration, each radio frame of 10 ms consists of 10 sub-frames of 1 ms. The radio frame on the backhaul link is arranged in accordance with TDD configuration 5, while the radio frame on the end-user access link is arranged in accordance with TDD configuration 3. Considering a radio frame on the backhaul link starting at the time $t_B$, the starting point of the radio frame is a DL sub-frame $n_B$. A radio frame on the end-user access link starts at time $t_F$, having a starting point of the radio frame in a DL sub-frame $n_F$. Again a downlink offset $T_{DL}$ denotes the time between the DL transmission on the backhaul link until the next DL scheduling opportunity is available on the end-user access link. Thus, $T_{DL}$ represents the extra time induced by having a TDD based wireless backhaul, i.e. the downlink offset determined when the backhaul sub-frame used in determining the offset is a downlink, DL, sub-frame, and the end-user access sub-frame used in determining the offset is a DL sub-frame representing the next DL scheduling opportunity in the end-user access of the wireless network.

In one embodiment, the average expected delay $T_{DL}$ is minimized by making sure that as many backhaul DL sub-frame as possible are followed by an end-user access DL sub-frame at the same time as the DL data is ready to be transmitted over the end-user access. This can e.g. be achieved by, for each possible position of the starting point $t_B$ in radio frame having the TDD configuration 5, determine the offset $T_{DL}$ to the next possible DL scheduling opportunity for the end-user access link and calculate a total offset $T_{DL}$ representing the offset of all sub-frames according to the configuration. The adjusting of the radio frames of the backhaul link and the end-user access link is performed based on the starting point $t_B$ of the backhaul link radio frame offering the lowest sum, e.g. by calculating an average delay for each sub-frame index in a radio frame for a time-shift $t_B$. Other weighting functions can also be considered, for example minimizing the maximum delay.

In another embodiment, the different DL sub-frames are given different weight making them more or less important with respect to the overall minimization of $T_{DL}$ using the approach described in the previous embodiment. Such weighting could for example be dependent on how different data and signaling are mapped onto the different sub-frames of the backhaul—some may contain more time-critical data than others with another QoS profile etc. Another example is Multicast Broadcast/Multimedia Service, MBMS, over Multicast-Broadcast Single Frequency Network, MBSFN, transmissions on some of the sub-frames. Here we assume that we know what sub-frames are used for multicast and that we do not have it in both links, typically only on the end-user link. A sub-frame containing MBMS over MBSFN cannot have downlink data and hence we do not need to consider the additional delay of this sub-frame.

Figure 7B:
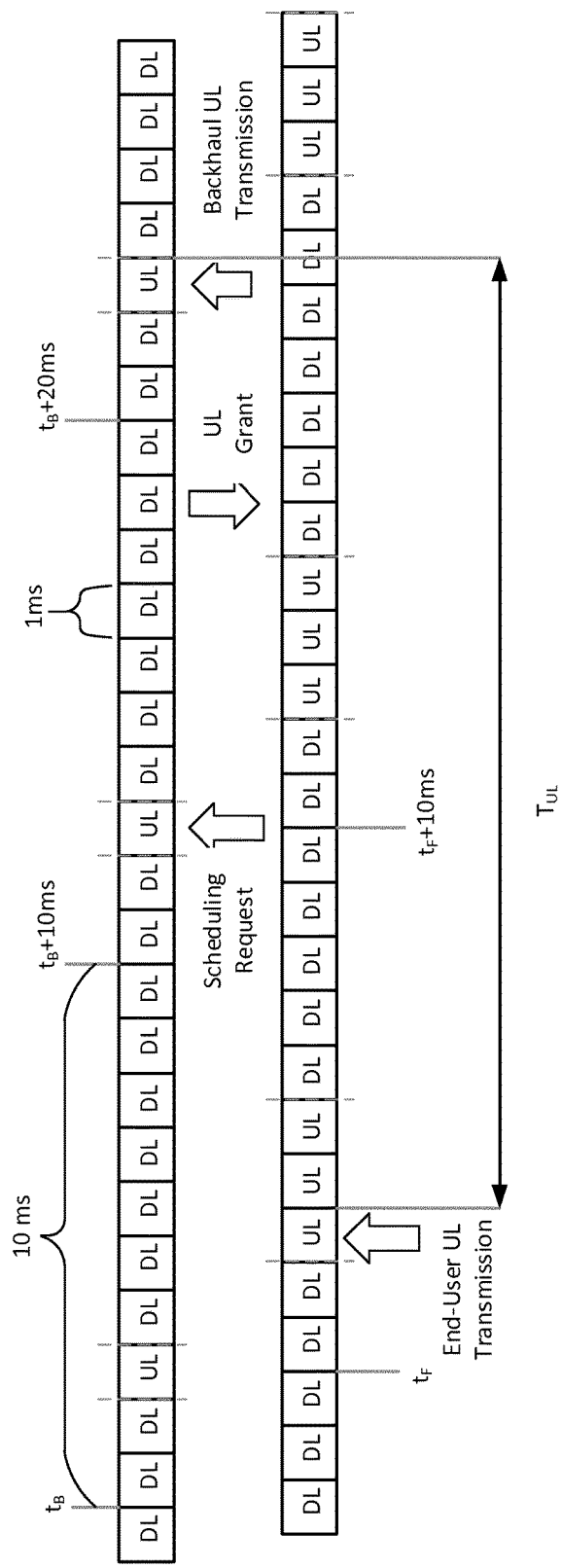
Figure 8:
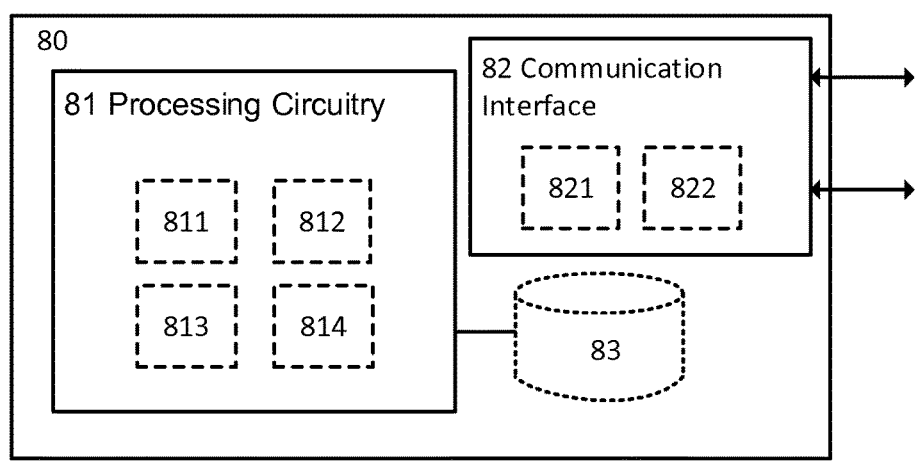
FIG. 8 is a block diagram schematically illustrating an example node configuration of a backhaul node, according to some of the example embodiments.

The same scenario, but now for uplink transmissions is shown in FIG. 7b. For this scenario, the minimization of $T_{UL}$ can be achieved in a similar way as for the downlink scenario described above but now making sure that as many end-user access UL sub-frames as possible are to be followed by a backhaul UL sub-frame at the same time as the UL data is ready to be transmitted over the backhaul. And of course, the delay can be further reduced by using advance scheduling as described in the previous section, alleviating the need of the delay imposed by the scheduling request and/or UL grant procedure.

Scenario 3: Flexible TDD

Consider now the case where either the backhaul link or the end-user link is configured with flexible TDD. In this case, the direction of some sub-frames may change direction on a fast time scale. In this case an average delay may be calculated similar to what was described for the above scenario of different TDD configurations for the backhaul and end-user access link.

The calculation will be based on a probability estimate that a specific sub-frame may be changed in the desired direction. The probability could be based on load expectation and or statistics and signaled information about the UL DL assignments in the end-user access.

As an example, we assume the probability of sub-frame 4 being uplink to 80% and the probability of sub-frame 4 being downlink to 90%. The average delay would for uplink be 0.8*1+0.2*3, assuming sub-frame 7, sub-frame 4+3, is a fixed uplink sub-frame. For downlink the delay would be 0.9*1+0.1*2, given that sub-frame 5 is fixed downlink sub-frame.

In another embodiment the time dynamic choices in the end-user access is signaled per TTI to the backhaul Flexible TDD configuration and whenever a UL is used, a first available UL sub-frame is also configured on the backhaul if the corresponding sub-frame is a flexible sub-frame. In the same way DL sub-frames can be dynamically configured. In some embodiments the buffer status of the UL and DL is also considered, to maintain a low delay in both uplink and downlink.

Please note that TDD based LTE is used as the exemplifying technology throughout this disclosure, but that the key concepts are applicable in any TDD-based system.

FIG. 9 is a block diagram illustrating an example node configuration of a network node 80 for performing the method step embodiments, e.g. an end-user access node, a backhaul node, a core network node or node in a management system of the wireless network. The network node 80 comprises a processor or processing circuitry 81, that may be constituted by any suitable Central Processing Unit, CPU, microcontroller, Digital Signal Processor, DSP, etc. capable of executing computer program code. The computer program may be stored in a memory 83. The memory 83 can be any combination of a Random Access Memory, RAM, and a Read Only Memory, ROM. The memory 83 may also comprise persistent storage, which, for example, can be any single one or combination of magnetic memory, optical memory, or solid state memory or even remotely mounted memory. The network node 80 further comprises a communication interface 82.

According to one aspect of the disclosure further relates to a computer-readable storage medium, having stored thereon the above mentioned computer program which when run in a network node, causes the node to coordinated transmission on a backhaul link with transmission on an end-user access link in a wireless network, wherein the transmission is performed in time division duplex, TDD, radio frames transmitted on respective frequency bands on the backhaul link and the end-user access link. When the above mentioned computer program is run in the processor of the network node 80, it causes the node to determine a backhaul TDD configuration of the backhaul link and an end-user access TDD configuration of the end-user access link; to select a backhaul sub-frame for the backhaul TDD configuration and an end-user access sub-frame for the end-user access TDD configuration; to determine an offset between the backhaul sub-frame and the end-user access sub-frame; and to shift transmission on the end-user access link with a time-shift relative to transmission on backhaul link, wherein the time-shift is based on the determined offset.

According to an aspect of the disclosure, the network node is a low power radio base station, RBS, of the wireless network. When the network node is a low power RBS, the communication interface 72 further comprises end-user access radio circuitry 721 for radio communication on a first frequency band in an end-user access interface and backhaul radio circuitry 722 for radio communication on a second frequency band in a backhaul interface.

According to an aspect of the disclosure, the network node is configured to operate with backhaul and end-user access TDD configurations being the same or differing from one another.

The disclosure also relates to a computer-readable storage medium, having stored there on a computer program which when run in a network node, causes the network node to perform the disclosed method.

According to a further aspect of the disclosure, processing circuitry 81 further comprises one or several of:

a TDD configuration determining module 811 configured to determine a backhaul TDD configuration of the backhaul link and an end-user access TDD configuration of the end-user access link;

a sub-frame selection module 812 configured to select a backhaul sub-frame for the backhaul TDD configuration and an end-user access sub-frame for the end-user access TDD configuration;

an offset determination module 813 arranged to determine an offset between the backhaul sub-frame and the end-user access sub-frame; and a transmission adjustment module 814 configured to adjust transmission on the backhaul link or on the end-user access link by a time-shift based on the determined offset.

The TDD configuration determination module 811, the sub-frame selection module 812, the offset determination module 813 and the transmission adjustment module are implemented in hardware or in software or in a combination thereof. The modules 811, 812, 813 and 814 are according to one aspect implemented as a computer program stored in a memory 83 which run on the processing circuitry 81.

Turning back to FIG. 5, the flow chart schematically illustrate example operations which may be performed by the network node, as described above, to coordinate transmission on a backhaul link and on an end-user access link. It should be appreciated that FIG. 5 illustrates a combination of operations. However, these operations may be performed in any suitable order or combination in order to arrive at the coordinated transmission.

Operation S51

The network node 80 is configured to determine a backhaul TDD configuration of the backhaul link and an end-user access TDD configuration of the end-user access link. The processing circuitry 81 is configured to determine the TDD configurations from information retrieved over the communication interface 82.

The disclosure is applicable for various combinations of TDD configurations determined for the backhaul link and the end-user access link. According to example embodiments, e.g. as previously disclosed for scenario 1, the backhaul TDD configuration and the end-user access TDD configuration are equal. According to other example embodiments, e.g. as previously disclosed for scenario 2, the backhaul TDD configuration and the end-user access TDD configuration differ. According to further example embodiments, embodiments, e.g. as previously disclosed for scenario 3, either the backhaul TDD configuration or the end-user access TDD configuration is a flexible TDD. Possible TDD configurations include Configuration 0-6 as defined in the LTE 3GPP standard and any combinations of these configurations.

However, it should be appreciated that the disclosure is not limited to these LTE TDD configurations, but is also applicable for any TDD configurations used in any wireless network standard. Furthermore, the disclosure is also applicable when uplink transmission and downlink transmission on the end-user access link and/or the backhaul link is performed on different frequency bands.

According to another example embodiment, in advance scheduling or Semi-persistent scheduling is used on the backhaul uplink, thereby reducing uplink transmission delay on the backhaul link.

Operation S52

The network node 80 also selects a backhaul sub-frame $n_B$ and an end-user access sub-frame $n_F$. The backhaul sub-frame $n_B$ and the end-user access sub-frame $n_F$ are selected in order to define reference points for the coordinating operations. The processing circuitry 81 is configured to select the backhaul sub-frame and the end-user access sub-frame.

Operation S53

The network node 80 determines an offset between the backhaul sub-frame and the end-user access sub-frame. The processing circuitry 81 is configured to determine the offset between the backhaul sub-frame and the end-user access sub-frame.

According to example embodiments, the offset is determined as a downlink offset $T_{DL}$ or as an uplink offset $T_{UL}$.

According to example embodiments for a downlink offset, the offset is determined as a time offset between a DL backhaul sub-frame and a DL end-user access sub-frame representing a next DL scheduling opportunity in the end-user access of the wireless network. The offset could also be determined as a time offset between a DL backhaul sub-frame and a DL end-user access sub-frame representing a preferred DL scheduling opportunity in the end-user access of the wireless network.

According to example embodiments for an uplink offset, the offset is determined as a time offset between an UL backhaul sub-frame and an UL end-user access sub-frame representing a preceding UL scheduling opportunity in the end-user access of the wireless network. The offset could also be determined as a time offset between an UL backhaul sub-frame and an UL end-user access sub-frame representing a preferred UL scheduling opportunity in the end-user access of the wireless network.

Operation S54

The network node 80 adjusts transmission on the backhaul link or on the end-user access link by a time-shift based on the determined offset. The processing circuitry 81 calculates the time-shift based on the determined offset and adjust transmission based on the calculated time-shift. When the operation is performed in a radio access node, e.g. a Pico RBS, the communication interface 82 is arranged to schedule traffic for the end-user access link with the time-shift adjustment. In accordance with an aspect of the disclosure, the adjusting of the transmission is applied on cell-time and synchronization signals for the time-shift. The time-shift may be relative to a predefined clock, where the predefined clock may be provided to the Pico RBS through the backhaul link from the hub, based on broadcasted information or dedicated control messages for providing network time. The clock may also come from other sources such as GPS. The clock may also be an internal clock in the Pico synchronized at deployment. The time-shift can be explicitly signaled from the determining network node to the node applying the time-shift, e.g. the Pico RBS or the hub, if the determining node is different from the one applying the time shift.

In accordance with an example embodiment for a downlink embodiment, the time-shift is the downlink offset $T_{DL}$ compensated for a decoding time $T_{DEC\_DL}$ for decoding data received over the backhaul and a preparation time $T_{PREP\_DL}$ for preparing transmission over the end-user access.

In accordance with an example embodiment for an uplink embodiment, the time-shift is the uplink offset $T_{UL}$ compensated for a decoding time $T_{DEC\_UL}$ for decoding data received over the end-user access and a preparation time $T_{PREP\_UL}$ for preparing transmission over the backhaul.

In accordance with a further example embodiment applicable to downlink transmission as well as uplink transmission, the time-shift is a weighted average of a downlink offset $T_{DL}$ compensated for a decoding time $T_{DEC\_DL}$ for decoding data received over the backhaul and a preparation time, ($T_{PREP\_DL}$) for preparing transmission over the end-user access; and an uplink offset ($T_{UL}$) compensated for a decoding time ($T_{DEC\_UL}$) for decoding data received over the end-user access and a preparation time ($T_{PREP\_UL}$) for preparing transmission over the backhaul.

In accordance with another example embodiment applicable to downlink transmission as well as uplink transmission, the time shift is further based on a probability estimate of the usage of DL and UL sub-frames.

For an example embodiment when either the backhaul TDD configuration or the end-user access TDD configuration is a flexible TDD, the time-shift is calculated based on a probability estimate that a direction of the backhaul sub-frame or the end-user access sub-frame is reversed in a direction corresponding to that of the end-user access sub-frame or the backhaul sub-frame.

Operation S541

When the disclosed operations are performed in a network node in e.g. the core network or a management system of the wireless network, a further operation is defined whereby the information on the time shift is provided to a radio base station, RBS, scheduling transmission on the end-user access link.

The disclosed combination of operations minimizes delays experienced when using a TDD operating mode on an end-user access link as well as on a wireless backhaul link. The end-user and control pane latency is reduced, thereby also reducing the need of buffering in a backhaul client.

The foregoing description of scenarios and example embodiments has been presented for purposes of illustration and description and is not intended to be exhaustive or to limit example embodiments to the precise form disclosed. Modifications and variations of the disclosed example embodiments are within the scope of the disclosure. The examples discussed herein were chosen and described in order to explain the principles and the nature of various example embodiments and its practical application to enable a person skilled in the art to utilize the example embodiments in various manners and with various modifications as are suited to the particular use contemplated. The features of the embodiments described herein may be combined in all possible combinations of methods, apparatus, modules, systems and computer program products.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

The invention claimed is:

1. A method, performed in a network node, of coordinating transmission on a backhaul link with transmission on an end-user access link in a wireless network, wherein transmission is performed in time division duplex, TDD, radio frames transmitted on respective frequency bands on the backhaul link and the end-user access link, the method comprising:
    determining a backhaul TDD configuration of the backhaul link and an end-user access TDD configuration of the end-user access link;
    selecting a backhaul sub-frame and an end-user access sub-frame;
    determining an offset between the backhaul sub-frame and the end-user access sub-frame based on the backhaul TDD configuration and the end-user access TDD configuration and an amount of time to get data received via one of the links ready for transmission on the other link; and
    adjusting transmission on the backhaul link or on the end-user access link by a time-shift based on the determined offset.

2. The method of claim 1, wherein the backhaul TDD configuration and the end-user access TDD configuration are the same.

3. The method of claim 2, wherein the offset is a downlink offset (TDL) and wherein the backhaul sub-frame is a downlink, DL, sub-frame and the end-user access sub-frame is a DL sub-frame representing a next DL scheduling opportunity in the end-user access of the wireless network.

4. The method of claim 3, wherein the time-shift is the downlink offset (TDL) compensated for a decoding time (TDEC_DL) for decoding data received over the backhaul and a preparation time, (TPREP_DL) for preparing transmission over the end-user access.

5. The method of claim 2, wherein the offset is an uplink offset (TUL) and wherein the backhaul sub-frame is an uplink, UL, sub-frame and the end-user access sub-frame is an UL sub-frame representing a preceding UL scheduling opportunity in the end-user access of the wireless network.

6. The method of claim 5, wherein the time-shift is the uplink offset (TUL) compensated for a decoding time (TDEC_UL) for decoding data received over the end-user access and a preparation time (TPREP_UL) for preparing transmission over the backhaul.

7. The method of claim 5, wherein the UL scheduling in the backhaul is an in advance scheduling or a Semi-Persistent Scheduling.

8. The method of claim 2, wherein the time-shift is a weighted average of a downlink offset (TDL) compensated for a decoding time (TDEC_DL) for decoding data received over the backhaul and a preparation time, (TPREP_DL) for preparing transmission over the end-user access; and an uplink offset (TUL) compensated for a decoding time (TDEC_UL) for decoding data received over the end-user access and a preparation time (TPREP_UL) for preparing transmission over the backhaul.

9. The method of claim 8, wherein the time-shift is further based on a probability estimate of the usage of DL and UL sub-frames.

10. The method of claim 1, wherein the TDD configuration is one of Configuration 0-6, as defined in the LTE 3GPP standard.

11. The method of claim 1, wherein the backhaul TDD configuration and the end-user TDD configuration differ.

12. The method of claim 11, wherein the offset is a downlink offset (TDL) and wherein the backhaul sub-frame is a downlink, DL, sub-frame and the end-user access sub-frame is a DL sub-frame representing a preferred DL scheduling opportunity in the end-user access of the wireless network.

13. The method of claim 11, wherein the offset is an uplink offset (TUL) and the backhaul sub-frame is an uplink, UL, sub-frame and the end-user access sub-frame is an UL sub-frame representing a preferred UL scheduling opportunity in the end-user access of the wireless network.

14. The method of claim 1, wherein the backhaul TDD configuration is one of Configuration 0-6 and the end-user access TDD configuration is another of Configuration 0-6, as defined in the LTE 3GPP standard.

15. The method of claim 1, wherein either the backhaul TDD configuration or the end-user access TDD configuration is a flexible TDD.

16. The method of claim 15, wherein the time-shift is calculated based on a probability estimate that a direction of the backhaul sub-frame or the end-user access sub-frame is reversed in a direction corresponding to that of the end-user access sub-frame or the backhaul sub-frame.

17. The method of claim 1, wherein uplink transmission and downlink transmission on the end-user access link and/or the backhaul link is performed on different frequency bands.

18. The method of claim 1, wherein the adjusting of transmission on the end-user access link comprises providing information on the time-shift to a radio base station, RBS, scheduling transmission on the end-user access link.

19. A network node for coordinating transmission on a backhaul link with transmission on an end-user access link in a wireless network, wherein transmission is performed in time division duplex, TDD, radio frames transmitted on respective frequency bands on the backhaul link and the end-user access link; the network node comprising a processing circuitry, a communication interface and a memory, said memory containing instructions executable by said processing circuitry, whereby said network node is operative:

determine a backhaul TDD configuration of the backhaul link and an end-user access TDD configuration of the end-user access link;

select a backhaul sub-frame for the backhaul TDD configuration and an end-user access sub-frame for the end-user access TDD configuration;

determine an offset between the backhaul sub-frame and the end-user access sub-frame based on the backhaul TDD configuration and the end-user access TDD configuration and an amount of time to get data received via one of the links ready for transmission on the other link; and adjust transmission on the backhaul link or on the end-user access link by a time-shift based on the determined offset.

20. The network node of claim 19, wherein the network node is part of the management system for the wireless network and the network node is further operative to shift transmission on the end-user access link by providing information on the time-shift to a radio base station, RBS, scheduling transmission on the end-user access link.

21. The network node of claim 19, wherein network node is a low power radio base station, RBS, of the wireless network and the communication interface further comprises end-user access radio circuitry for radio communication on a first frequency band in an end-user access interface and backhaul radio circuitry for radio communication on a second frequency band in a backhaul interface.

22. The network node of claim 21, wherein the backhaul TDD configuration and the end-user access TDD configuration is the same.

23. The network node of claim 21, wherein the backhaul TDD configuration and the end-user access TDD configuration differ.

* * * * *